March 23, 1937.  E. P. SEXTON  2,074,761
FLUID PRESSURE BRAKE
Filed Aug. 1, 1936
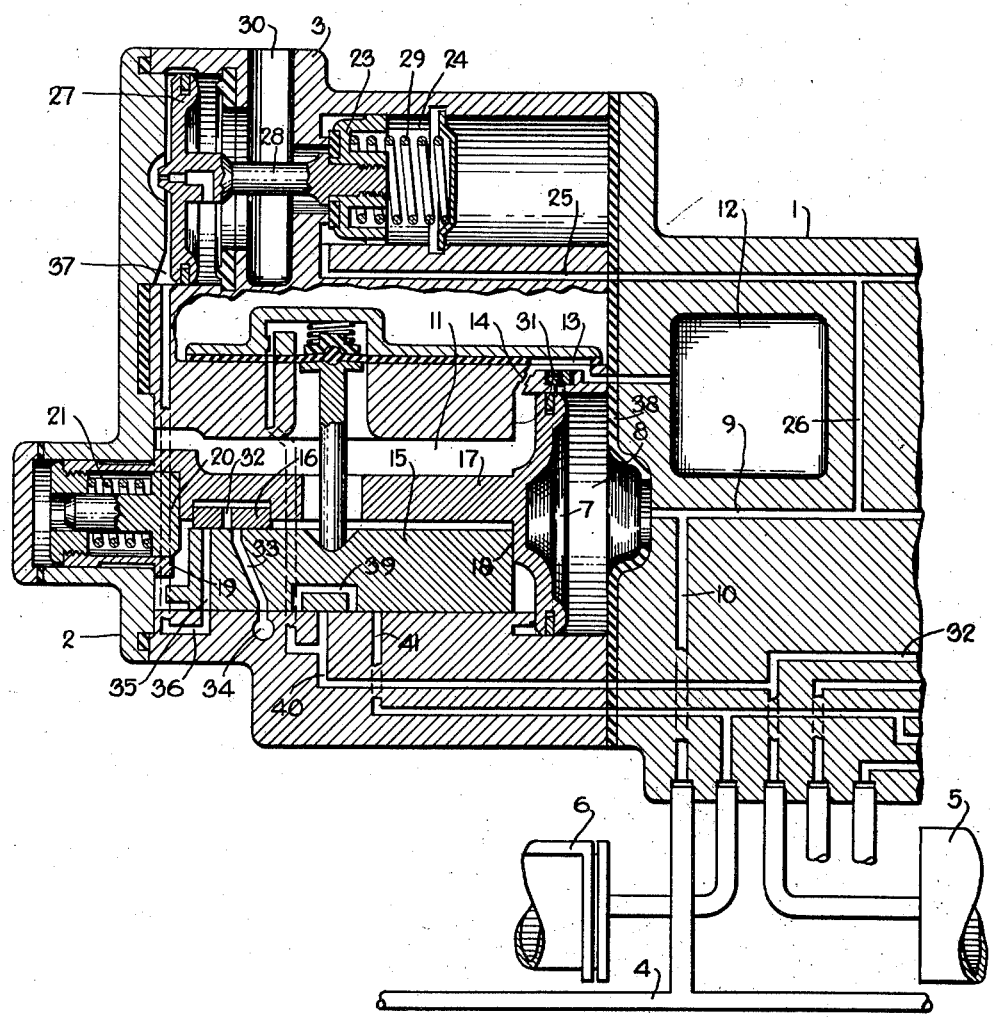
INVENTOR
EVERETT P. SEXTON
BY *Wm. H. Cady*
ATTORNEY Patented Mar. 23, 1937

2,074,761

UNITED STATES PATENT OFFICE 2,074,761

FLUID PRESSURE BRAKE

Everett P. Sexton, East McKeesport, Pa., assignor to The Westinghouse Air Brake Company, Wilmerding, Pa., a corporation of Pennsylvania Application August 1, 1936, Serial No. 93,730

12 Claims. (Cl. 303—42)

This invention relates to fluid pressure brakes and more particularly to the type adapted to operate upon a reduction in brake pipe pressure to effect an application of the brakes and upon an increase in brake pipe pressure to effect a release of the brakes.

In Patent 2,031,213, issued to Clyde C. Farmer on February 18, 1936, there is disclosed a fluid pressure brake equipment including a service valve device which is operative upon a service reduction in brake pipe pressure to effect a service application of the brakes, and an emergency valve device which is operative along with the service valve device upon an emergency reduction in brake pipe pressure to effect an emergency application of the brakes.

In the emergency valve device, a piston is provided which is subject to the opposing pressures of the brake pipe and a valve chamber. The valve chamber is in communication with a quick action chamber through a relatively large passage through which the pressures in said valve and quick action chambers are adapted to vary substantially together. The piston is adapted to be operated by the pressure of fluid in the valve and quick action chambers upon a service rate of reduction in brake pipe pressure to move an auxiliary slide valve to a service position in which fluid under pressure is vented from said chambers at such a rate as to prevent a sufficient differential of pressures being developed on said piston upon a service reduction in brake pipe pressure as to cause said piston to move said valve past the service position to an emergency position in which an emergency application of the brakes would be effected. The emergency piston and auxiliary slide valve are so proportioned as to be moved to service position by a relatively small differential, such as .4 of a pound, between the pressures in the brake pipe and quick action chamber. In order to stabilize this service action of the piston against possible undesired movement past the service position as would tend to occur before the pressure in the valve and quick action chambers had time to reduce to any appreciable degree, a spring is provided to become effective substantially in service position to oppose further movement of the piston. This spring is of such value as to require a definite increase, such as .5 of a pound, in the differential of pressures on the emergency piston to cause same to move past service position, so it, therefore, acts to stop said piston in the service position in which the venting of fluid from the valve and quick action chambers will prevent obtaining said increase in differential.

The communication through which fluid under pressure is vented from the emergency valve and quick action chambers in service position of the auxiliary slide valve is restricted to such a degree that the pressure therein can not reduce as fast as the brake pipe pressure reduces upon an emergency reduction in brake pipe pressure in which case the differential of pressures on the emergency piston will promptly increase, even in service position, to a degree such as one pound, which is normally sufficient to overcome the pressure of the spring acting on the piston and then move the auxiliary slide valve to the emergency position for initiating an emergency application of the brakes.

It has been found that the static resistance to movement of the emergency piston occasionally increases due, it is believed, to slight deposits of foreign matter on and around the piston and on the piston cylinder wall and this foreign matter tends to prevent the piston from starting to move on the differential of pressures intended. If this static resistance to movement of the piston becomes sufficiently great, there is a possibility that such a high differential of pressures will be obtained on said piston before it starts to move that after it starts to move upon a service reduction in brake pipe pressure, its inertia and the rapidity of its movement will be such that the restricted service venting of fluid under pressure from the valve and quick action chambers and the pressure of the spring which comes into action in the service position will not be sufficient to stop said piston in service position, and as a result, said piston will move on to emergency position and thereby initiate an undesired emergency application of the brakes.

This undesired movement of the emergency piston to emergency position upon a service reduction in brake pipe pressure is dependent upon a sufficient differential of pressures being maintained on said piston as it moves, to keep it going, and such may occur since the relatively large communication connecting the quick action chamber to the valve chamber permits the pressure in the valve chamber to be maintained substantially equal to that in the quick action chamber, regardless of how fast the emergency piston moves away from its normal position and regardless of the fact that such movement increases the volume of the valve chamber by an amount equal to the displacement volume of said piston as it moves.

It is undesirable to have an emergency application of the brakes occur upon effecting a service reduction in brake pipe pressure since such generally results in the stopping of a train which interferes with the operating schedule thereof. Further, an emergency application of the brakes is liable to cause damage to the cars in a train or to the lading carried thereby, and the principal object of the invention is to provide improved means for preventing an emergency application of the brakes from occurring upon a service reduction in brake pipe pressure due to conditions such as above described.

Other objects and advantages will be apparent from the following, more detailed description of the invention.

In the accompanying drawing, the single figure is a diagrammatic view of a portion of a fluid pressure brake equipment embodying the invention.

The portion of a fluid pressure brake equipment, shown in the drawing, is similar to a corresponding emergency portion of the brake equipment disclosed in the aforementioned patent, but only those parts are shown which are deemed essential to a comprehensive understanding of the invention.

The portion of a fluid pressure brake equipment, shown in the drawing, comprises a pipe bracket 1 having a face upon which there is mounted an emergency valve device 2 and a brake pipe vent valve device 3. Connected to the pipe bracket is a brake pipe 4, an emergency reservoir 5 and a brake cylinder 6.

The emergency valve device 2 comprises an emergency piston 7, having at one side a chamber 8 connected to the brake pipe 4 through passages 9 and 10, and having at the opposite side a valve chamber 11 which is connected to a quick action chamber or volume reservoir 12 through a passage 13.

A main slide valve 15 and an auxiliary slide valve 16 are disposed in the valve chamber 11 for operation by the piston 7 through the medium of a stem 17 carried by said piston. The stem 17 has a cavity in which the auxiliary slide valve 16 is disposed and is provided with spaced shoulders 18 and 19 adapted to engage the main slide valve 15 for moving same. The outer end of the piston stem 17 is slidably mounted in a suitable bore in the casing of the device and carries a plunger 20 movable longitudinally of the stem in alignment for engagement with the left hand end of the main slide valve 15. A spring 21 in the stem 17 acts on the plunger 20 urging same to its normal position which is slightly to the right of the shoulder 19 on the stem, as shown in the drawing.

The brake pipe vent valve device comprises a vent valve 23 contained in a chamber 24 which is connected to brake pipe 4 through passages 25, 26, 9 and 10, and further comprises a piston 27 which is operative to unseat said vent valve through the medium of a connecting stem 28. A spring 29 in chamber 24 acts on the vent valve 23 normally urging same to its seated position for closing communication from chamber 24 to a chamber 30 which is open to the atmosphere.

In operation, in order to initially charge the equipment with fluid under pressure, fluid under pressure supplied to brake pipe 4 in the usual well known manner flows therefrom through passages 10 and 9 to the emergency piston chamber 8 and also from passage 9 through passages 26 and 25 to the vent valve chamber 24.

With the parts of the emergency valve device in their normal position, as shown in the drawing, fluid under pressure supplied to chamber 8 flows through a restricted charging port 31 to passage 13 and from thence in one direction to the emergency valve chamber 11 and in the opposite direction to the quick action chamber 12.

In charging the equipment with fluid under pressure, the service portion of the equipment (not shown) is operated to supply fluid under pressure to passage 32 and from thence to the emergency reservoir 5 for charging said reservoir and is also operated to open the brake cylinder 6 to the atmosphere so as to provide for a release of brakes, but these operations do not enter into the invention and a more complete description thereof is, therefore, not deemed essential.

In order to effect a service application of the brakes, a service rate of reduction is effected in the pressure in brake pipe 4 and consequently in the pressure in the emergency piston chamber 8 and fluid under pressure then tends to flow back from the valve chamber 11 and quick action chamber 12 to piston chamber 8 through the restricted charging port 31, but this flow back of fluid under pressure is so restricted that the brake pipe pressure promptly starts reducing below the pressure acting in the valve chamber 11.

If the static resistance to movement of the emergency piston 7 is substantially normal, then when the brake pipe pressure acting in chamber 8 is reduced slightly, such as .4 of a pound, below the pressure in the valve chamber 11, the differential of pressures acting on said piston moves same and thereby the auxiliary slide valve 16 towards the right hand relative to the main slide valve 15 causing the service port 32 in said auxiliary slide valve to move into registry with the service port 33 in said main slide valve, and through these ports and an atmospheric passage 34 fluid under pressure is vented from the valve chamber 11 and quick action chamber 12 to the atmosphere at such a rate as to reduce the pressure in said chambers at substantially the same rate as the brake pipe pressure in chamber 8 is reduced, so as to thereby reduce the differential of pressures on said piston to prevent said piston from moving the auxiliary slide valve 16 past service position.

At about the time that the port 32 moves into full registry with port 33, the plunger 20 engages the left hand end of the main slide valve 15 so that further movement of said piston towards the right hand is opposed by the pressure of spring 21 acting on said plunger, which spring is of such value as to require a predetermined increase, such as .5 of a pound, in the differential of pressures acting on piston 7 in order that said piston 7 may continue its movement towards the right hand. This spring, therefore, acts to stabilize the piston against moving the auxiliary slide valve 16 past the service position, to that the vent communication through ports 32 and 33 and passage 34 will function to reduce the pressure in chambers 11 and 12 in the manner above described.

If an emergency rate of reduction in pressure is effected in the brake pipe 4 and consequently in piston chamber 8, a differential of pressures is promptly established on the emergency piston 7 as hereinbefore described, and if the emergency valve device is in proper working condition, the piston 7 promptly moves the auxiliary slide valve 16 to the service position in which port 32 registers with port 33. The venting capacity of these ports is, however, so restricted that the pressure in chambers 11 and 12 can only reduce at a service rate which is slower than an emergency rate of reduction in brake pipe pressure. As a consequence, the differential of pressures on the emergency piston 7 promptly increases to a value which overcomes spring 21 and moves said piston and thereby the auxiliary slide valve 16 to emergency position which is defined by the engagement of shoulder 19 on the piston stem 17 with the left hand end of the main slide valve 15.

In this emergency position, the auxiliary slide valve 16 uncovers an emergency port 35 which permits fluid under pressure to flow from the valve chamber 11 and quick action chamber 12 through said port to passage 36 and from thence to chamber 37 at the left hand side of the vent valve piston 27. The pressure of fluid thus obtained on the vent valve piston 27 shifts said piston in a direction towards the right hand and thus unseats the vent valve 23 against the opposing pressure of spring 29.

When the vent valve 23 is unseated, fluid under pressure is suddenly vented from the brake pipe 4 through passages 10, 9, 26 and 25, through chamber 24 to chamber 30 and from thence to the atmosphere, this sudden reduction in brake pipe pressure being effected to cause the emergency valve device on the next car in a train to operate in a similar manner and thus transmit emergency operation serially from car to car through a train.

When the brake pipe pressure is suddenly reduced by the operation of the vent valve 23, a corresponding reduction is effected in the pressure in the emergency piston chamber 8 and this promptly provides a sufficient differential of pressures on the emergency piston 7 to cause same to shift the main slide valve 15 towards the right hand to a position in which said piston seals against a gasket 38.

In this position of the emergency piston 7 and slide valve 15 said slide valve uncovers passage 36 so that fluid under pressure then flows directly from chambers 11 and 12 to said passage and from thence to chamber 37 so as to maintain the vent valve 23 unseated to ensure complete venting of fluid under pressure from the brake pipe 4. In this position of the slide valve 15, a cavity 39 therein connects a passage 40, which is connected to the emergency reservoir 5, to a passage 41 leading to the brake cylinder 6 and through this communication fluid under pressure is permitted to flow to said brake cylinder for effecting an emergency application of the brakes.

If the static frictional resistance to movement of the emergency piston 7 becomes increased due to accumulation of foreign matter or the like on the piston or on the wall of the cylinder in which the piston operates, it will be evident that said piston will not move the auxiliary slide valve 16 to service position when a .4 pound differential of pressures is obtained on said piston upon a service reduction in brake pipe pressure, as hereinbefore described. Instead, the differential of pressures must be increased to a degree sufficient to overcome the static resistance to movement of the piston, and if said static resistance and differential become sufficiently great before the piston starts moving, then after the piston does start, the differential will tend to move said piston and auxiliary slide valve 16 so fast and with such force that said piston will tend to quickly overcome the pressure of spring 21 and move through service position to emergency position and thereby initiate an emergency application of the brakes, which is undesired upon a service reduction in brake pipe pressure.

According to the invention, a choke or restriction 14 is provided in the passage 13 between the quick action chamber 12 and valve chamber 11 in order to prevent such an undesired emergency application of the brakes occurring upon a service reduction in brake pipe pressure.

The choke 14 is provided to restrict the flow of fluid under pressure from the quick action chamber 12 to the valve chamber 11 to such a degree that the pressure in said valve chamber will not be maintained from said quick action chamber, when, after a high differential of pressures is developed on said piston due to its being stuck by foreign matter or the like, it suddenly lets go and in effect, jumps towards service and emergency positions. In other words, when the emergency piston 7 moves towards the right hand it in effect increases the volume of the valve chamber 11 at the left hand side of said piston an amount equal to the displacement volume of the piston, and due to the action of choke 14 to hold back the flow of fluid under pressure from quick action chamber 12 to the valve chamber 11 and the rapidity of the movement of said piston under such conditions, a very material reduction in pressure occurs in the valve chamber 11 which will reduce the differential on said piston to a degree where it will stop moving before emergency position is reached, at which time the service ports 32 and 33 are in registry, venting fluid under pressure from said valve chamber 11, and the spring 21 is also effective, so that once said piston is stopped or substantially so, the venting action of the service ports 32 and 33 and the action of spring 21 will prevent sufficient differential from being again obtained on said piston to cause it to again start moving upon the service reduction in brake pipe pressure.

To be more specific, the actual volume of the valve chamber 11, i. e., the chamber at the left hand side of the emergency piston 7, when said piston is in its normal position, is about 10 cu. in., while the volume of the quick action chamber 12 is about 160 cu. in., making a total volume of 170 cu. in. normally charged with fluid under pressure for moving the emergency piston 7 and slide valves 15 and 16 upon a reduction in brake pipe pressure.

The piston 7 is substantially 10 sq. in. in area and its movement and that of the auxiliary slide valve 16 from normal position to service position, in which the ports 32 and 33 are in full registry, is about .090 in. This movement of the piston 7 will, therefore, increase the volume of the valve chamber 11 about .9 cu. in. With the passage 13 sufficiently large to permit the large volume of fluid under pressure in chamber 12 to substantially maintain the pressure in valve chamber 11 equal to that in chamber 12 upon sudden movement of piston 7, the reduction in pressure in said chamber, due to its increase in volume by .9 cu. in., on account of the displacement of said piston, will have no material effect upon stopping the piston from moving on to emergency position upon a service reduction in brake pipe pressure. In other words, assume that the static resistance of said piston is such as to require a three pound differential to start it moving. A reduction in this differential to 2.55 pounds, due to the displacement volume of the piston after it starts moving, will not stop said piston from moving on to emergency position. The relatively low kinetic friction of the parts also aids in permitting the slightly reduced differential of fluid pressures to effect such movement to emergency position.

The choke 14, however, acts to retard the flow of fluid under pressure from the quick action chamber 12 to the valve chamber 11 upon sudden movement of the emergency piston 7, as just described, so that when said piston suddenly moves from its normal position, the displacement volume thereof will effect sufficient reduction in pressure in the valve chamber 11 to reduce the differential of fluid pressures on said piston to a very low degree or substantially zero, depending upon the rapidity of movement of the piston after it breaks loose, and this reduction in differential will cause said piston to stop.

To be more specific, if the volume of valve chamber 11 is suddenly increased from 10 cu. in. to 10.9 cu. in. by movement of the piston from its normal position to, say, service position, the action of choke 14 will permit reduction in pressure in said valve chamber of around five pounds from seventy pounds, such as normally carried in freight service. Such a reduction in pressure in valve chamber 11 is sufficient to balance the pressures on the emergency piston and cause it to cease moving even if such an excessive reduction as five pounds in brake pipe pressure were required to break it loose. If the piston only required three pounds differential to start it moving, obviously the pressures on the piston could be substantially balanced and the piston thereby stopped before the service position were reached. The auxiliary slide valve 16 may move .020 inch past the service position, in which ports 32 and 33 are in full registry, before the emergency port 35 starts to open, and during which movement the service ports 32 and 33 are still in partial registry, so it will be evident that even if in a remote instance an emergency piston should require a differential such as six or seven pounds to start it moving, this further movement of the emergency piston is capable of providing sufficient reduction in pressure in the valve chamber to stop the piston.

After the emergency piston 7 is once moved out of its normal position and then stopped before the emergency position is reached, the service ports 32 and 33 will be in registry to permit the venting of fluid under pressure from valve chamber 11 and quick action chamber in the same manner as hereinbefore described.

The choke 14 is operative to prevent undesired movement of the emergency piston to emergency position, as above described, only upon a service rate of reduction in brake pipe pressure; it cannot prevent movement to emergency position upon an emergency rate of reduction in brake pipe pressure and will not have any material effect upon such intended operation.

The fact that the choke 14 will accomplish the purpose intended is due to the fact that a service rate of reduction in brake pipe pressure is relatively slow, and if, for instance, a three pound differential of pressures is required on the emergency piston to start it moving, the brake pipe pressure is only reduced to sixty-seven pounds, assuming seventy pounds pressure to be that normally carried, at the instant said piston breaks loose and starts moving, and the movement is so rapid, that the pressure in the valve chamber need only be reduced to that in the brake pipe at that instant, or substantially sixty-seven pounds, to stop movement of said piston.

Upon an emergency rate of reduction in brake pipe pressure however, the action of choke 14 will not prevent the intended movement of the emergency piston to emergency position, because the brake pipe pressure reduces so rapidly that, before the piston can be stopped ahead of the emergency position, sufficient differential is obtained thereon to continue its movement to the emergency position, and this continued movement is also aided by the relatively low kinetic friction of the moving parts at this time.

It will be apparent that the choke 14 has relatively large flow capacity as compared, for instance, to that of the restricted charging port 31 and will have no effect upon operation of the emergency valve device upon a service reduction in brake pipe pressure, if the piston 7 is in condition to operate as intended.

The particular location of the choke 14 in the passage 13 is not pertinent since its only function is to retard the flow of fluid under pressure from the quick action chamber 12 to the valve chamber 11.

It will be further understood that the drawing is merely diagrammatic to illustrate the use of the invention and is not intended to show dimensions and volumes of such size or proportions mentioned in the above description of the invention.

From the above description of the invention, it will be evident that a very simple, but novel means, has been provided adapted to be employed in connection with emergency valve devices such as above described whereby undesired emergency operation thereof may be prevented upon a service reduction in brake pipe pressure, in case the static resistance to movement of the emergency piston becomes increased to a degree greater than normal, due to accumulations of foreign matter, or the like.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, and an emergency valve device comprising a piston subject to the opposing pressures of the brake pipe and a chamber normally charged with fluid under pressure, and valve means operative by said piston upon a reduction in brake pipe pressure at a service rate for venting fluid under pressure from said chamber at a service rate and operative by said piston upon a reduction in brake pipe pressure at an emergency rate for effecting an emergency application of the brakes, and a volume reservoir normally charged with fluid under pressure and connected to said chamber through a restricted port adapted at all times to limit the rate at which the pressure in said chamber is maintained by flow from said reservoir to said chamber.

2. In a fluid pressure brake, in combination, a brake pipe, and an emergency valve device comprising a piston subject to the opposing pressures of the brake pipe and a chamber normally charged with fluid under pressure, and valve means operative by said piston upon a reduction in brake pipe pressure at a service rate for venting fluid under pressure from said chamber at a service rate and operative by said piston upon a reduction in brake pipe pressure at an emergency rate for effecting an emergency application of the brakes, and a volume reservoir normally charged with fluid under pressure and connected to said chamber through a port of such size that sudden movement of said piston upon a reduction in brake pipe pressure will reduce the pressure in said chamber to a degree below that in said reservoir.

3. In a fluid pressure brake, in combination, a brake pipe, and an emergency valve device comprising a piston subject to the opposing pressures of the brake pipe and a chamber normally charged with fluid under pressure, and valve means operative by said piston upon a reduction in brake pipe pressure at a service rate for venting fluid under pressure from said chamber at a service rate and operative by said piston upon a reduction in brake pipe pressure at an emergency rate for effecting an emergency application of the brakes, and a volume reservoir normally charged with fluid under pressure and connected to said chamber through a port of such size that the increase in volume of said chamber upon sudden movement of said piston will reduce the pressure in said chamber to substantially the pressure in the brake pipe before said piston moves sufficiently to operate said valve means to effect an emergency application of the brakes upon a service rate of reduction in brake pipe pressure.

4. In a fluid pressure brake, in combination, a brake pipe, and an emergency valve device comprising a piston subject to the opposing pressures of the brake pipe and a chamber normally charged with fluid under pressure, and valve means operative by said piston upon a reduction in brake pipe pressure at a service rate for venting fluid under pressure from said chamber at a service rate and operative by said piston upon a reduction in brake pipe pressure at an emergency rate for effecting an emergency application of the brakes, and a volume reservoir normally charged with fluid under pressure and connected to said chamber through a port of such size as will restrict the flow of fluid under pressure from said reservoir to said chamber upon sudden movement of said piston whereby the pressure in said chamber will be reduced to substantially that in said brake pipe before said piston operates said valve means to effect an emergency application of the brakes, if upon a service rate of reduction in brake pipe pressure said piston does not promptly respond to a service rate of reduction in brake pipe pressure.

5. In a fluid pressure brake, in combination, a brake pipe, and an emergency valve device comprising a piston subject to the opposing pressures of the brake pipe and a chamber normally charged with fluid under pressure, and valve means operative by said piston upon a reduction in brake pipe pressure at a service rate for venting fluid under pressure from said chamber at a service rate and operative by said piston upon a reduction in brake pipe pressure at an emergency rate for effecting an emergency application of the brakes, said chamber being of relatively small volume whereby movement of said piston upon a reduction in brake pipe pressure will effect a substantial increase in the volume of said chamber, and a reservoir of relatively large volume normally charged with fluid under pressure and connected to said chamber through a port of such size that the pressure in said reservoir will not maintain the pressure in said chamber upon sudden movement of said piston upon a reduction in brake pipe pressure.

6. In a fluid pressure brake, in combination, a brake pipe, and an emergency valve device comprising a piston subject to the opposing pressures of the brake pipe and a chamber normally charged with fluid under pressure, and valve means operative by said piston upon a reduction in brake pipe pressure at a service rate for venting fluid under pressure from said chamber at a service rate and operative by said piston upon a reduction in brake pipe pressure at an emergency rate for effecting an emergency application of the brakes, and a volume reservoir normally charged with fluid under pressure and connected to said chamber through a port of such size that suddent movement of said piston will reduce the pressure in said chamber to substantially that in said brake pipe before said piston operates said valve means to effect an emergency application of the brakes upon a service rate of reduction in brake pipe pressure.

7. In a fluid pressure brake, in combination, a brake pipe, and an emergency valve device comprising a piston subject to the opposing pressures of said brake pipe and a chamber normally charged with fluid under pressure, a volume reservoir connected to said chamber and normally charged with fluid under pressure, and valve means movable by said piston upon a reduction in brake pipe pressure at a service rate to a service position for establishing a communication through which the pressure of fluid in said chamber and reservoir is adapted to reduce at a service rate and movable past service position to an emergency position upon an emergency rate of reduction in brake pipe pressure for effecting an emergency application of the brakes, a retriction in the connection between said reservoir and chamber for limiting the rate of flow of fluid under pressure from said reservoir into said chamber upon movement of said piston whereby, if the movement of said piston is sudden upon a service rate of reduction in brake pipe pressure, the increase in volume of said chamber due to such movement will reduce the pressure in said chamber sufficiently to stop said piston and thereby said valve means before reaching emergency position.

8. In a fluid pressure brake, in combination, a brake pipe, and an emergency valve device comprising a piston subject to the opposing pressures of said brake pipe and a chamber normally charged with fluid under pressure, a volume reservoir connected to said chamber and normally charged with fluid under pressure, and valve means movable by said piston upon a reduction in brake pipe pressure at a service rate to a service position for establishing a communication through which the pressure of fluid in said chamber and reservoir is adapted to reduce at a service rate and movable past service position to an emergency position upon an emergency rate of reduction in brake pipe pressure for effecting an emergency application of the brakes, a restriction in the connection between said reservoir and chamber for limiting the rate of flow of fluid under pressure from said reservoir into said chamber upon movement of said piston whereby, if the movement of said piston is sudden upon a service rate of reduction in brake pipe pressure, the increase in volume of said chamber due to such movement will reduce the pressure in said chamber sufficiently to stop said piston and thereby said valve means in substantially service position in which said communication is opened and the venting of fluid under pressure from said chamber at a service rate will prevent further movement of such piston and valve means upon a service rate of reduction in brake pipe pressure.

9. In a fluid pressure brake, in combination, a brake pipe, and an emergency valve device comprising a piston subject to the opposing pressures of said brake pipe and a chamber normally charged with fluid under pressure, a volume reservoir connected to said chamber and normally charged with fluid under pressure, and valve means movable by said piston upon a reduction in brake pipe pressure at a service rate to a service position for establishing a communication through which the pressure of fluid in said chamber and reservoir is adapted to reduce at a service rate and movable past service position to an emergency position upon an emergency rate of reduction in brake pipe pressure for effecting an emergency application of the brakes, a spring operative to oppose movement of said piston and valve means past service position to emergency position, a restriction in the connection between said reservoir and chamber operative upon sudden movement of said piston to permit the displacement volume of said piston to reduce the pressure in said chamber sufficiently that said spring will prevent movement of said piston and valve means past the service position upon a service rate of reduction in brake pipe pressure.

10. In a fluid pressure brake, in combination, a brake pipe, an emergency valve device comprising a piston subject to the opposing pressures of said brake pipe and a valve chamber communicating with a quick action chamber, said valve and quick action chambers being normally charged with fluid under pressure, and valve means movable by a certain differential established between the pressures in said brake pipe and valve chamber upon a service rate of reduction in brake pipe pressure to a service position for effecting a service rate of reduction in pressure in said chambers and movable by a greater differential established upon an emergency rate of reduction in brake pipe pressure to an emergency position for effecting an emergency application of the brakes, and means for restricting the flow of fluid under pressure from said quick action chamber to said valve chamber for preventing maintenance of the pressure in said valve chamber upon sudden movement of said piston upon a reduction in brake pipe pressure whereby, if upon a service rate of reduction in brake pipe pressure, a differential of pressures as great as said greater differential is obtained on said piston before said piston starts moving, the movement of said piston will reduce the differential to substantially said certain differential before said piston moves said valve means past service position.

11. In a fluid pressure brake, in combination, a brake pipe, an emergency valve device comprising a piston subject to the opposing pressures of said brake pipe and a valve chamber communicating with a quick action chamber, said valve and quick action chambers being normally charged with fluid under pressure, and valve means movable by a certain differential established between the pressures in said brake pipe and valve chamber upon a service rate of reduction in brake pipe pressure to a service position for effecting a service rate of reduction in pressure in said chambers and movable by a greater differential established upon an emergency rate of reduction in brake pipe pressure to an emergency position for effecting an emergency application of the brakes, spring means for opposing operation of said piston to move said valve means past service to emergency position upon a service rate of reduction in brake pipe pressure, and means for restricting flow of fluid under pressure from said quick action chamber to said valve chamber upon sudden movement of said piston, whereby, if upon a service rate of reduction in brake pipe pressure a differential of pressures as great as said greater differential is obtained on said piston before said piston starts moving, movement of said piston will reduce the pressure in said valve chamber and thereby the differential of pressures on said piston to a degree sufficient that the pressure of said spring will prevent movement of said piston past service position.

12. In a fluid pressure brake, in combination, a brake pipe, an emergency valve device comprising a piston subject to the opposing pressures of said brake pipe and a valve chamber communicating with a quick action chamber, said valve and quick action chambers being normally charged with fluid under pressure, and valve means movable by a certain differential established between the pressures in said brake pipe and valve chamber upon a service rate of reduction in brake pipe pressure to a service position for effecting a service rate of reduction in pressure in said chambers and movable by a greater differential established upon an emergency rate of reduction in brake pipe pressure to an emergency position for effecting an emergency application of the brakes, spring means for opposing operation of said piston to move said valve means past service to emergency position upon a service rate of reduction in brake pipe pressure, and means for restricting flow of fluid under pressure from said quick action chamber to said valve chamber upon sudden movement of said piston, whereby, if upon a service rate of reduction in brake pipe pressure a differential of pressures as great as said greater differential is obtained on said piston before said piston starts moving, movement of said piston will reduce the pressure in said valve chamber and thereby the differential of pressures on said piston to a degree sufficient that the pressure of said spring will prevent movement of said piston past service position in which the venting of fluid under pressure from said chambers at a service rate will prevent obtaining sufficient differential of pressures on said piston to overcome said spring as the reduction in brake pipe pressure continues at a service rate.

EVERETT P. SEXTON.